Jan. 22, 1963  C. A. DENKER  3,074,743
TRAILER HITCH
Filed July 25, 1960  2 Sheets-Sheet 1

INVENTOR.
CLYDE A. DENKER.
BY Max E. Shirk
ATTORNEY.

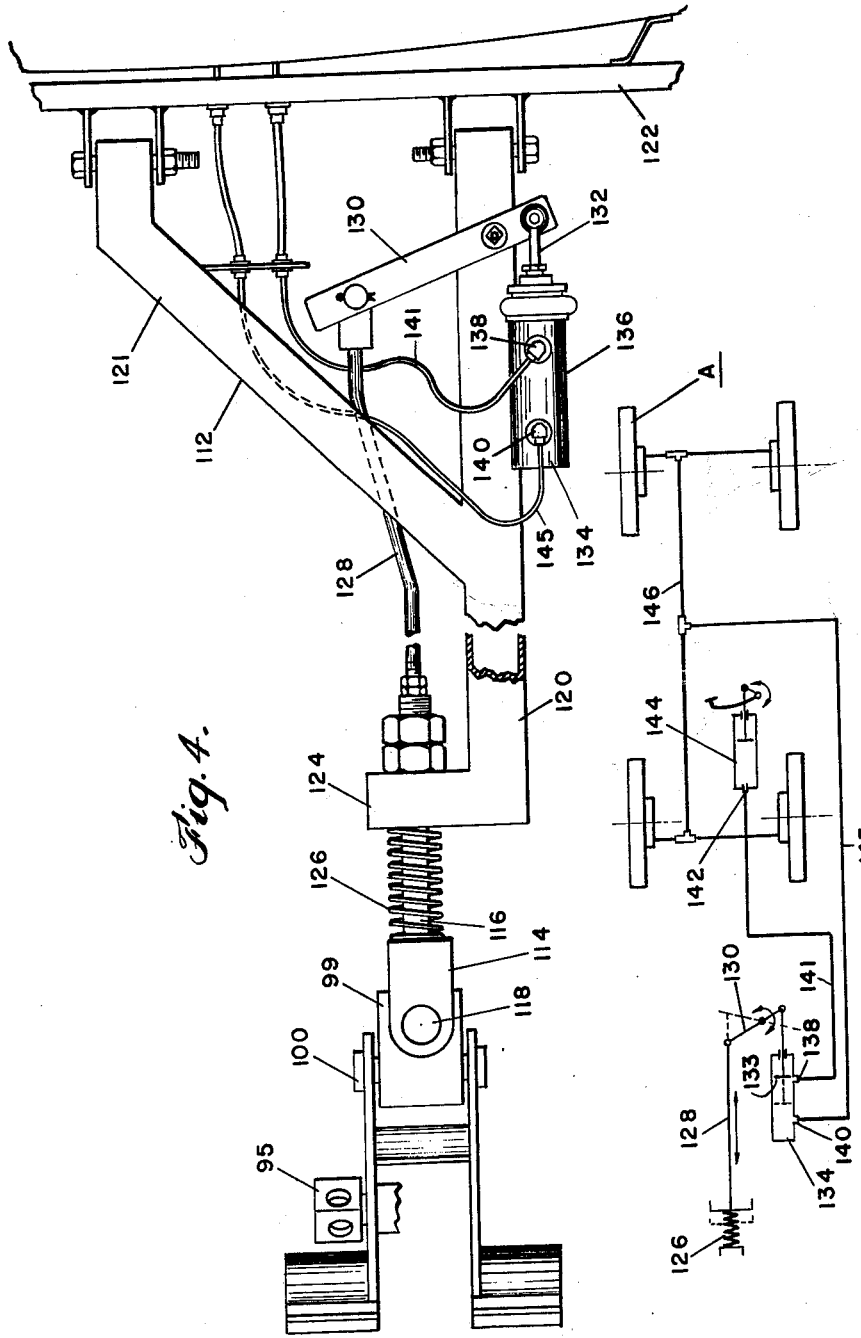

United States Patent Office 3,074,743
Patented Jan. 22, 1963

3,074,743
TRAILER HITCH
Clyde A. Denker, 3614 E. Glenn St., Tucson, Ariz.
Filed July 25, 1960, Ser. No. 45,246
2 Claims. (Cl. 280—502)

This invention relates to trailer hitches and is a continuation-in-part of my copending application, Serial No. 756,581 filed August 22, 1958, now abandoned. More particularly, the invention relates to a brake applying hitch which may be easily and readily attached to, and detached from, automobile bumpers and which is combined with means for stopping a towed vehicle when a towing vehicle is stopped.

In service stations and garages it is quite often necessary to call for and deliver customers' cars. In order to prevent sending two men to pick up a customer's car, a motorcycle or small car having a tow bar mounted on the front bumper is used to transport the employee to the location of the customer's car. He then drives the customer's car back to the garage towing the motorcycle or small vehicle behind.

Some of the cars on the market today have rear bumpers of such shape and configuration that ordinary trailer hitches will not clamp thereon. Even though a special trailer hitch be designed which will clamp on a modern bumper, the forward thrust of the towed vehicle which results when the towing vehicle suddenly decreases its speed causes the trailer hitch to bend the bumper to which it is attached. Also, the top edge of the rear bumpers on a majority of present day automobiles is recessed under the automobile body which prevents using the top edge of the bumper for engagement by a trailer hitch. These problems are overcome with the device of my invention.

An object of the invention is to provide a brake applying trailer hitch having a bumper clamp which is quickly attachable to, and detachable from, automobile bumpers.

Another object of the invention is to provide a brake applying trailer hitch which may be applied to a wide variety of sizes and shapes of automobile bumpers.

A further object of the invention is to provide a very simple, practical and relatively inexpensive brake applying trailer hitch which can be readily manufactured and assembled and which is exceedingly effective for the purpose for which it is designed.

A still further object of the invention is to provide a brake applying trailer hitch which is effective to energize the braking system of a towed vehicle when the speed of the towing vehicle is suddenly decreased.

With the above and other objects in view, the present invention consists in combination and arrangement of parts, hereinafter more fully described, illustrated in the accompanying drawings, and more particularly pointed out in the appended claims, is being understood that changes may be made in the form, size, proportion and minor details of construction, without deparing from the spirit of the invention.

In the drawings:

FIGURE 4 is a plan view of a brake applying trailer hitch of the invention; and

FIGURE 5 is a schematic view showing a hydraulic system employed with the brake applying trailer hitch of FIGURE 4.

Figure 1:
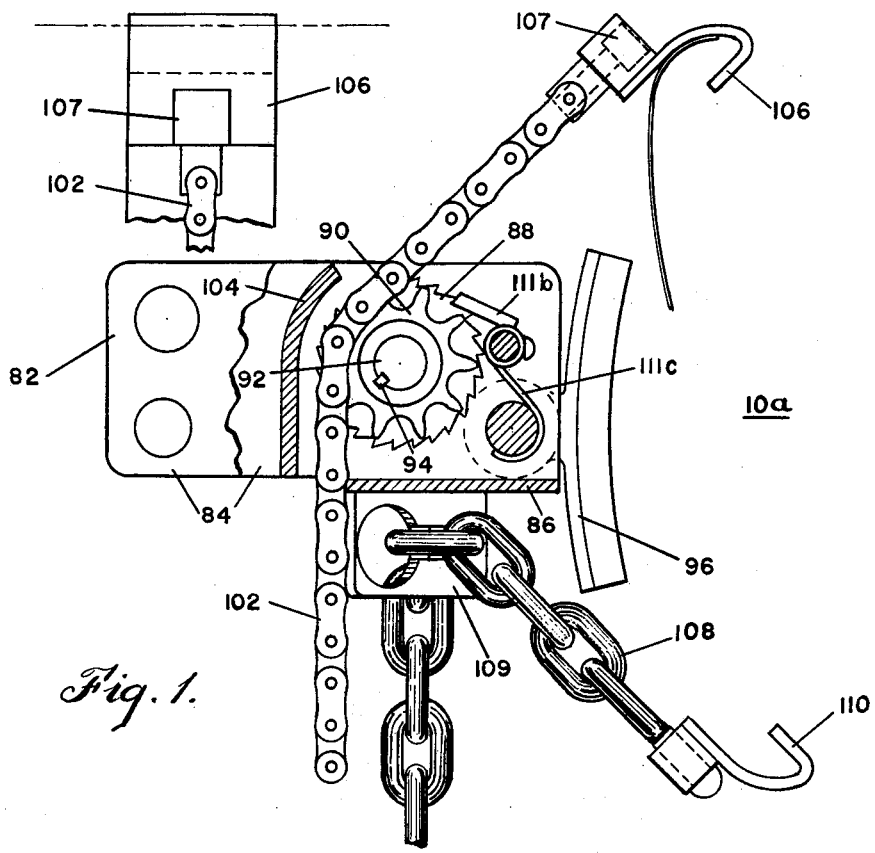
FIGURE 1 is a side elevational view of the bumper engaging portion of my improved brake applying trailer hitch.

Referring now to the drawings, the bumper engaging portion 10a of my improved brake applying trailer hitch is shown attached to means for applying the brakes of a towed vehicle.

Figures 2, 3:
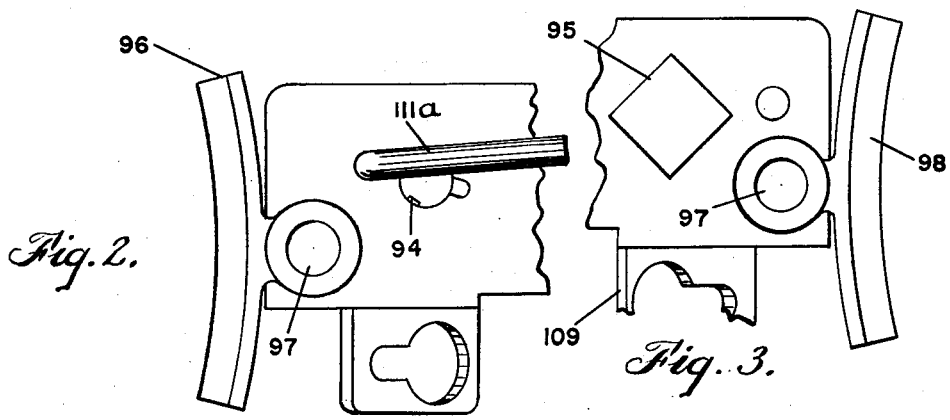
FIGURE 2 is a side elevational view showing part of one front cover plate and other features of the bumper engaging portion shown in FIGURE 1.
FIGURE 3 is a side elevational view showing part of the other front cover plate and other features of the bumper engaging portion shown in FIGURE 1.

The bumper engaging portion 10a includes a housing 82 comprising side plates 84 and a bottom plate 86. A ratchet wheel 88 and a sprocket 90 are secured to a shaft 92 by means of a key 94. The shaft 92 is rotatably mounted on the side plates 84 superjacent the bottom plate 86 and carries an extension 95 (FIG. 3) to accomodate a wrench or similar tool employed to rotate the sprocket 90.

A bumper engaging block 96 is rotatably mounted on a shaft 97 near the front of the housing 82 and includes a resilient pad 98. A swivel block 99 (FIG. 4) is rotatably mounted on a shaft 100 near the rear of housing 82. A roller chain 102 is trained about the rear half of the sprocket 90 and is retained in engagement therewith by means of a curved channel 104 which is rigidly affixed to the inside walls of the side plates 84 intermediate the sprocket 90 and the block 99. A bumper engaging hook 106 is swivally mounted on one end of the roller chain 102. The hook 106 is swivally mounted to facilitate hooking it to the inner edge of a bumper which has its top edge recessed under the body of an automobile. A link chain 108 is carried by a flange 109 which is rigidly affixed to the underside of bottom plate 86. A hook 110 is swivally mounted on one end of the link chain 108. A dog 111b is employed to engage the ratchet wheel 88 and is biased by a spring 111c. A lever 111a (FIG. 2) is used to release the dog 111b from engagement with the ratchet wheel 88.

The bumper engaging portion 10a may be attached to a tow bar 112 by means of a clevis 114 which includes a spindle 116. The clevis 114 is pivotally mounted on the block 99 by means of a pin 118.

The tow bar 112 includes a straight member 120 and a yoke member 121 which have one end swingably mounted on a bumper 122 of a towed vehicle. The other end of the straight member 120 has a spindle receiving member 124 rigidly affixed at right angles thereto.

The spindle 116 is slidably mounted on the spindle receiving member 124 and carries a compression spring 126 between the clevis 114 and the member 124. A push rod 128 is rigidly affixed to the free end of the spindle 116 and is linked to a lever 130. The lever 130 is pivotally mounted intermediate its ends on the straight member 120.

The end of the lever 130 remote from the push-rod 128 is linked to the push rod 132 of the piston 133 of a hydraulic cylinder 134. The hydraulic cylinder 134 includes a housing 136, an inlet port 138 and an outlet port 140. The inlet port 138 is in hydraulic communication, through a conduit 141, with the main outlet port 142 of the master cylinder 144 of the towed vehicle A (FIG. 5). The outlet port 140 of the cylinder 134 is in hydraulic communication, through a conduit 145, with a hydraulic line 146 which carries hydraulic fluid to the individual brakes of the car A.

In operation of the invention, the hook 110 on the link chain 108 is placed in engagement with lower lip of and automobile bumper and the link chain 108 is drawn tight enough to bring the bumper engaging block 96 into contact with the automobile bumper. One link of the chain 108 is then slid into a slot in the flange 109. The hook 106 on the roller chain 102 may be hooked over the upper lip of the automobile bumper or the hook 106 may be rotated 90 degrees on the swivel 107 and hooked over and edge of the automobile bumper in the license plate well on those automobile bumpers having the center section cut away. The sprocket 90 may then be rotated to draw the chain 102 taut. As the chain 102 is drawn taut, the bumper engaging portion 10a will rotate upwardly about the shaft 97 using the bumper engaging block 96 as a fulcrum. This will draw the link chain 108 taut and keep the bumper engaging block 96 in firm engagement with the automobile bumper.

When the speed of a towing vehicle is suddenly decreased sufficiently to cause the forward thrust of the towed vehicle A to overcome the force of the compressed spring 126, the spindle receiving member 124 will slide forward on the spindle 116 causing the push-rod 128 to move the lever 130 in a clockwise direction about its pivot on the straight member 120. This will pressurize the hydraulic cylinder 134 forcing hydraulic fluid out the outlet port 140 to apply the brakes of the towed vehicle and prevent damage to the bumper of the towing vehicle. When the forward thrust is eliminated, the lever 130 will be forced back to its normal position by the spring 126 and pull the piston of the hydraulic cylinder 134 back behind the inlet port 138 so that hydraulic fluid may be admitted to the cylinder 134 from the master cylinder 144.

It will be seen that I have invented a simple, practical and relatively inexpensive brake applying trailer hitch which can be readily manufactured and assembled, and which is exceedingly effective for the purpose for which it is designed. It is to be understood that the forms of my invention shown and described herein are to be taken as preferred examples of the same and that various changes in the shape, size and arrangement of components may be resorted to without departing from the spirit and scope of the invention.

I claim:

1. A brake applying hitch device for applying the brakes of a towed vehicle should it tend to over-ride a towing vehicle, said towed vehicle including a hydraulic master cylinder having an outlet port, hydraulic wheel cylinders and first conduit means placing said wheel cylinders in hydraulic communication with each other, comprising:
    a tow-bar mounted on said vehicle;
    a spindle reciprocably mounted on said tow-bar;
    a hydraulic cylinder mounted on said tow-bar, said hydraulic cylinder having an inlet port, an outlet port and a piston, said piston having a normally retracted position upstream of said inlet port;
    link means connecting one end of said spindle to said piston in such a manner that reciprocation of said spindle reciprocates said piston;
    bumper clamp means mounted on the other end of said spindle for connecting said towed vehicle to said towing vehicle;
    spring means biasing said piston to its retracted position;
    second conduit means for connecting the inlet port of said tow-bar hydraulic cylinder in fluid communication with the outlet port of said master cylinder; and
    third conduit means for placing the outlet port of said tow-bar hydraulic cylinder in fluid communication with said first conduit means.

2. The brake applying hitch device of claim 1 wherein said bumper clamp means comprises:
    a body portion having a sprocket wheel rotatably mounted thereon,
    a chain trained about said sprocket wheel;
    a bumper engaging hook swivelly mounted on one end of said chain;
    fulcrum means pivotly mounted on said body portion for bearing against the bumper of said towing vehicle at an angle such that tightening of said chain revolves said trailer hitch about said fulcrum means until the front edge of said trailer hitch is substantially parallel to a line tangent at the point of least inflection of the base of said bumper.

References Cited in the file of this patent

UNITED STATES PATENTS

| | | |
|---|---|---|
| 1,896,427 | Selvester | Feb. 7, 1933 |
| 2,458,667 | Williams | Jan. 11, 1949 |
| 2,575,596 | Rettinger | Nov. 20, 1951 |
| 2,633,942 | Barnes | Apr. 7, 1953 |
| 2,646,290 | Cox | July 21, 1953 |
| 2,790,521 | Klein | Apr. 30, 1957 |
| 2,847,023 | Hansen | Aug. 12, 1958 |